US008874671B2

(12) United States Patent
Pasquero et al.

(10) Patent No.: US 8,874,671 B2
(45) Date of Patent: Oct. 28, 2014

(54) ELECTRONIC MESSAGE METERING AND TRAFFIC MANAGEMENT IN A NETWORKED ENVIRONMENT

(75) Inventors: Jerome Pasquero, Kitchener (CA); Julia Murdock Thompson, Kitchener (CA); Janice Leigh De Jong, Kitchener (CA)

(73) Assignee: BlackBerry Limited, Waterloo (CA)

( * ) Notice: Subject to any disclaimer, the term of this patent is extended or adjusted under 35 U.S.C. 154(b) by 280 days.

(21) Appl. No.: 13/370,766

(22) Filed: Feb. 10, 2012

(65) Prior Publication Data

US 2013/0212185 A1    Aug. 15, 2013

(51) Int. Cl.
*G06F 15/16* (2006.01)
*G06Q 10/10* (2012.01)

(52) U.S. Cl.
CPC .............. *G06Q 10/107* (2013.01); *G06Q 10/10* (2013.01)
USPC ............ 709/206; 709/203; 709/204; 709/205

(58) Field of Classification Search
CPC ................................ G06Q 10/10; H04L 51/26
USPC ..................................... 709/203–206; 726/26
See application file for complete search history.

(56) References Cited

U.S. PATENT DOCUMENTS

| | | | |
|---|---|---|---|
| 5,508,817 A | 4/1996 | Kunigami | |
| 5,771,289 A | 6/1998 | Kuzma | |
| 6,047,272 A | 4/2000 | Biliris et al. | |
| 7,222,193 B2 | 5/2007 | Stringer | |
| 7,280,982 B1 | 10/2007 | Moskowitz et al. | |
| 7,386,520 B2 | 6/2008 | Hehl et al. | |
| 7,606,214 B1 | 10/2009 | Chandra et al. | |
| 7,689,563 B1* | 3/2010 | Jacobson ..................... 707/663 | |
| 7,873,572 B2 | 1/2011 | Reardon | |
| 7,918,388 B2 | 4/2011 | Abecassis et al. | |
| 7,991,706 B2 | 8/2011 | Mattern | |
| 2006/0041505 A1 | 2/2006 | Enyart | |
| 2007/0130001 A1 | 6/2007 | Jung et al. | |
| 2008/0059552 A1 | 3/2008 | Blohm | |
| 2009/0012875 A1 | 1/2009 | Zanini et al. | |
| 2009/0018910 A1 | 1/2009 | Jung et al. | |
| 2009/0049134 A1 | 2/2009 | Kumhyr et al. | |
| 2009/0099930 A1 | 4/2009 | Jung et al. | |
| 2009/0119678 A1* | 5/2009 | Shih et al. ..................... 719/313 | |

(Continued)

OTHER PUBLICATIONS

Extended European Search Report dated Aug. 14, 2012 from EP12154974.5, 10 pgs.

(Continued)

*Primary Examiner* — Hitesh Patel
(74) *Attorney, Agent, or Firm* — Jenna L. Wilson; Dimock Stratton LLP

(57) ABSTRACT

A system, method, electronic device and server are provided for metering electronic messages and for managing message traffic within an organization. An electronic message resistance value is stored for recipients within an organization. When a message is composed and addressed at a sending terminal, the electronic message resistance value may be retrieved and displayed at the sending terminal. The message server receiving the composed message for transmission to the recipient sends the message to the recipient in accordance with a priority determined based on the recipient's electronic message resistance; for example, the message may be sent with a low priority attribute, or the transmission of the message to the recipient may be delayed for a set period of time.

20 Claims, 6 Drawing Sheets

(56) References Cited

U.S. PATENT DOCUMENTS

| | | |
|---|---|---|
| 2009/0138355 A1 | 5/2009 | Jung et al. |
| 2009/0182832 A1 | 7/2009 | O'Sullivan et al. |
| 2009/0313336 A1 | 12/2009 | Haynes et al. |
| 2010/0191818 A1* | 7/2010 | Satterfield et al. ............ 709/206 |
| 2010/0199177 A1* | 8/2010 | Kraenzel et al. ............. 715/261 |
| 2010/0228598 A1 | 9/2010 | Seuken et al. |
| 2010/0250356 A1 | 9/2010 | Gillenson et al. |
| 2010/0332975 A1* | 12/2010 | Chang et al. ................. 715/256 |
| 2011/0022664 A1 | 1/2011 | Ainsworth |
| 2012/0131108 A1* | 5/2012 | Barsness et al. ............. 709/206 |
| 2012/0215866 A1* | 8/2012 | Satterfield et al. ............ 709/206 |

OTHER PUBLICATIONS

AuYoung, A. et al., "Resource Allocation in Federated Distributed Computing Infrastructures", 2004, pp. 1-10.

Sipior, J. C., Ward, B. T., Bonner, P. G., "Should Spam Be on the Menu?", Communications of the ACM, Jun. 2004, vol. 47, No. 6, pp. 59-63.

Partial European Search Report dated Apr. 17, 2012 from EP12154974.5.

* cited by examiner

ELECTRONIC MESSAGE METERING AND TRAFFIC MANAGEMENT IN A NETWORKED ENVIRONMENT

BACKGROUND

1. Technical Field

The present disclosure relates generally to the metering and traffic management of electronic messages in a networked environment.

2. Description of the Related Art

Electronic messaging, and email in particular, is a heavily used means of communication between users within an organization due in part to its ease of use and suitability for communication that does not need to be completed in real time. The ease of use and pervasiveness of electronic messaging causes some users to perceive electronic messages as virtually costless, when in fact there is a cost to the organization providing users with the necessary messaging infrastructure. Examples of the costs not readily apparent to the user include the cost of storing and backing up messages, and the resources needed to handle message traffic generally.

Because these costs are not apparent, some users may make inappropriate or excessive use of the organization's messaging system, for example by sending a large number of messages of marginal informational value, needlessly addressing messages to a large number of recipients, or by using the messaging system to transfer large files to other users rather than using alternate file transfer and sharing services. This behaviour can result in a recipient receiving a large number of messages, making it difficult for the recipient to identify the more important messages that require attention. At the same time, the sender of a message may not realize the impact of his or her messaging behaviour on the recipient or messaging infrastructure.

BRIEF DESCRIPTION OF THE DRAWINGS

In drawings which illustrate by way of example only embodiments of the present application.

DETAILED DESCRIPTION

Figure 1:
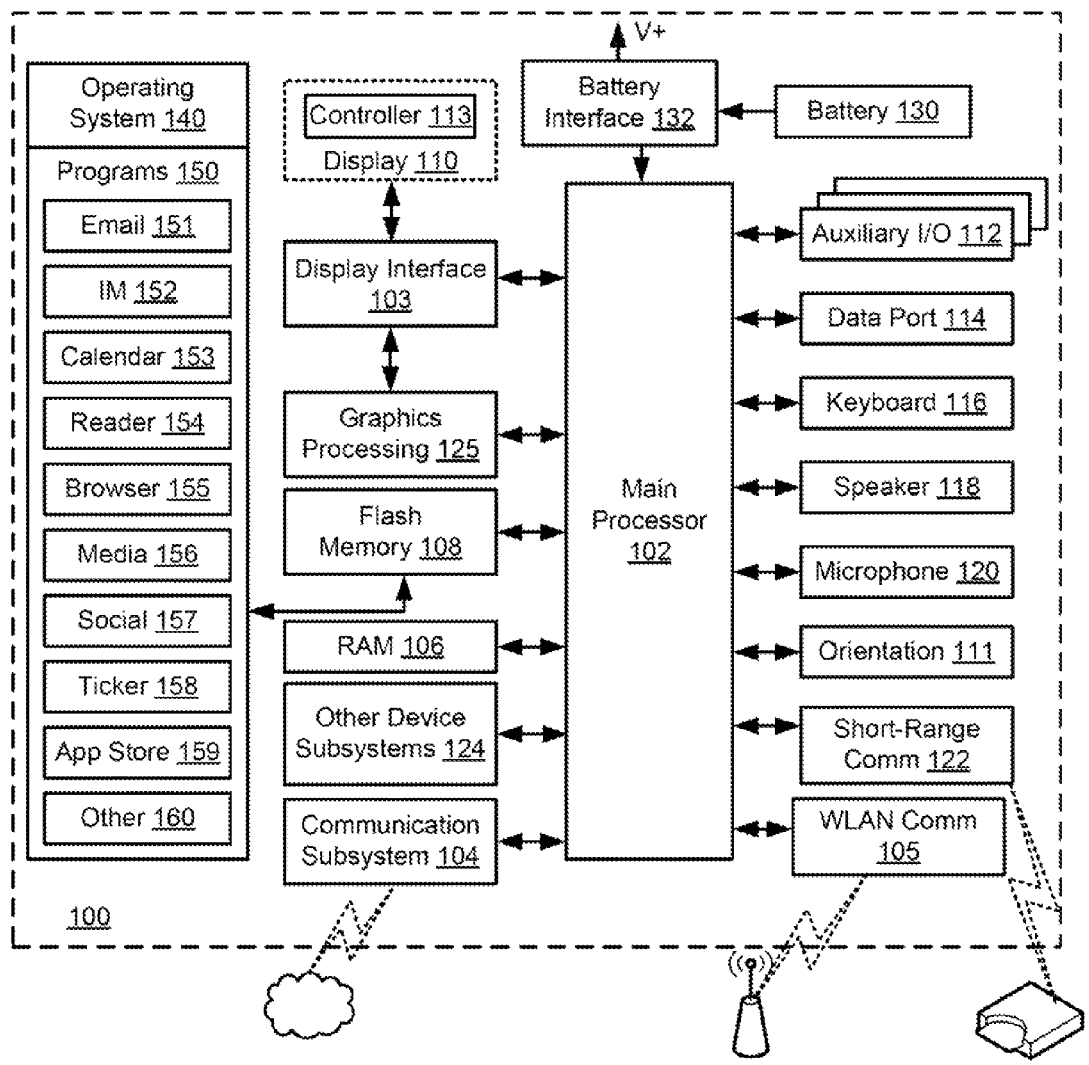
FIG. 1 is a schematic diagram of an example electronic device for use with the embodiments described herein.

The embodiments described herein provide an improved system and method for metering electronic messages and for managing message traffic within an organization. These embodiments will be described and illustrated primarily in relation to email, the definition and format of which is generally known to those skilled in the art. However, it will be appreciated by those skilled in the art that these embodiments can be extended to other types and formats of messages, including without limitation instant messages (IM), both server-based and peer-to-peer; SMS (Short Message Service); MMS (Multimedia Messaging Service); VVM (Visual Voicemail), voicemail, and the like. The formatting and transmission of all such messages, and the implementation of suitable messaging infrastructures to support such communications, will be known to those skilled in the art.

The embodiments herein thus provide a method implemented at a message server system, the method comprising: storing an electronic message resistance for a recipient; receiving, from a sending terminal, an electronic message addressed to the recipient; and sending the electronic message to the recipient with a priority based on the electronic message resistance for the recipient.

In one aspect, sending the electronic message with said priority based on the electronic message resistance comprises associating the electronic message with a low priority attribute when the electronic message resistance for the recipient exceeds a defined threshold.

In another aspect, sending the electronic message with said priority based on the electronic message resistance comprises delaying sending the electronic message for a defined period of time.

In a further aspect, the method further comprises, prior to receiving the electronic message from the sending terminal, providing an indication of the electronic message resistance for the recipient in response to a request received from the sending terminal.

In still another aspect, the priority is determined from a difference between the electronic message resistance for the recipient and an electronic message resistance for a sender of the electronic message.

In yet a further aspect, sending the electronic message with said priority comprises: determining whether the electronic message resistance for the recipient exceeds a limit based on an electronic message resistance for a sender of the electronic message; when the electronic message resistance for the recipient exceeds the limit, either: associating a low priority attribute with the electronic message, or delaying sending the electronic message for a defined period of time; and when the electronic message resistance for the recipient does not exceed the limit, sending the electronic message without a low priority attribute and without delaying said sending for a defined period of time. In an aspect thereof, determining whether the electronic message resistance for the recipient exceeds the limit comprises determining whether a combined electronic message resistance for electronic messages sent to recipients by the sender during a defined period exceeds said limit, said limit being reset at a start of a next defined period.

Still further, in another aspect the method further comprises, prior to storing the electronic message resistance, receiving an indication of the electronic message resistance for said recipient from a terminal associated with the recipient.

There is also provided a method implemented at a sending device in communication with a message server system, the method comprising: detecting selection of a recipient for an electronic message being composed at the sending device; receiving from the message server system, in response to a request, an electronic message resistance for the recipient thus selected; displaying an indication of an electronic message handling policy for the electronic message being composed, the electronic message handling policy being determined from the received electronic message resistance, the policy comprising at least one of: a priority attribute to be associated with the electronic message being composed after said message is sent to the message server for transmission to the recipient; and a delay at the message server in transmitting said message to the recipient.

Further, there is provided a message server, comprising: a communications subsystem; and a data store comprising an electronic message resistance for each of a plurality of recipients; the message server being configured to: receive, via the communications subsystem from a sending terminal, an electronic message addressed to at least one of the plurality of recipients; and send, to each of the at least one of the plurality of recipients via the communications subsystem, the electronic message with a priority based on the electronic message resistance for each said recipient.

In one aspect, the message server is configured to send the electronic message with said priority based on the electronic message resistance by associating the electronic message with a low priority attribute when the electronic message resistance for said recipient exceeds a defined threshold.

In another aspect, the message server is configured to send the electronic message with said priority based on the electronic message resistance by delaying sending the electronic message to said recipient for a defined period of time.

In still another aspect, the message server is configured to provide to the sending terminal, prior to receipt of the electronic message, an indication of the electronic message resistance for each of the at least one of the plurality of recipients in response to a request received from the sending terminal.

In a further aspect, the data store further comprises an electronic message resistance for a sender of the electronic message, and the priority is determined from a difference between the electronic message resistance for said recipient and the electronic message resistance for the sender.

In still a further aspect, the data store further comprises an electronic message resistance for a sender of the electronic message, and the message server is further configured to: determine whether the electronic message resistance for the recipient exceeds a limit based on an electronic message resistance for a sender of the electronic message; when the electronic message resistance for each of the at least one of the plurality of recipients exceeds the limit, either: send the electronic message to said recipient with a low priority attribute, or delay sending the electronic message to said recipient for a defined period of time; and when the electronic message resistance for said recipient does not exceed the limit, send the electronic message to said recipient without a low priority attribute and without delaying said sending for a defined period of time. Determining whether the electronic message resistance for the recipient exceeds the limit may comprise determining whether a combined electronic message resistance for electronic messages sent to recipients by the sender during a defined period exceeds said limit, said limit being reset at a start of a next defined period.

In any of these embodiments, the electronic message resistance may determined from a number of unread messages in an electronic message inbox associated with each recipient; from a current time of day at a terminal associated with each recipient; and/or from a number of electronic messages addressed to the recipient received within a defined period of time.

There is also provided a program product comprising an electronic device-readable medium, which may be physical or non-transitory, bearing code which, when executed by one or more processors of an electronic device, causes the device to implement the methods described herein.

The embodiments herein are described in the context of an organizational structure or domain. An organization may be a corporate, educational, or governmental organization; it may also be a collective of associated individuals, with or without a common objective, as in the case of an online messaging service. The organization's messaging infrastructure, which includes message servers, communication lines, and the like, may be self-hosted or hosted elsewhere, as in the case of a cloud-based service. A possible network topology including the organization and possible client devices is described with reference to FIG. 2 below. The client device employed by senders or recipients within the organization may be an electronic device such as that depicted in FIG. 1. An organizational structure or domain is but one example of the context in which these embodiments may be implemented; these embodiments may be applied in other contexts. In lieu of a defined organization such as a corporate organization, for example, the context may be an online messaging service to which a number of users subscribe, and which the users access by means of their own individual client devices that operate outside the online messaging service's domain. The various types of appropriate environments for implementing the embodiments described herein will be known to those skilled in the art.

FIG. 1 is a block diagram of an example embodiment of an electronic device 100 that may be used with the embodiments described herein. The electronic device 100 includes a number of components such as a main processor 102 that controls the overall operation of the electronic device 100. It should be understood that the components described in FIG. 1 are optional and that an electronic device used with various embodiments described herein may include or omit components described in relation to FIG. 1.

The electronic device 100 may be a battery-powered device including a battery interface 132 for receiving one or more rechargeable batteries 130. Communication functions, including data and voice communications, are performed through one or more communication subsystems 104, 105, and/or 122 in communication with the processor 102. Data received by the electronic device 100 can be decompressed and decrypted by a decoder, operating according to any suitable decompression techniques, and encryption/decryption techniques according to one or more various encryption or compression standards known to persons of skill in the art.

If equipped with a communication subsystem 104, this subsystem 104 receives data from and sends data to a wireless network. In this embodiment of the electronic device 100, the communication subsystem 104 is configured in accordance with one or more wireless communications standards. New wireless communications standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for the wireless communications standard, and optionally other network communications.

The electronic device 100 may be provided with other communication subsystems, such as a wireless LAN (WLAN) communication subsystem 105 or a short-range and/or near-field communications subsystem 122 also shown in FIG. 1. The WLAN communication subsystem 105 may operate in accordance with a known network protocol such as one or more of the 802.11™ family of standards developed or maintained by IEEE. The communications subsystems 105 and 122 provide for communication between the electronic device 100 and different systems or devices without the use of the wireless network, over varying distances that may be less than the distance over which the communication subsystem 104 can communicate with the wireless network. The subsystem 122 can include an infrared device and associated circuits and/or other components for short-range or near-field communication.

It should be understood that any of the communication subsystems 104, 105, 122 may optionally be included in the electronic device 100. Alternatively, a communication subsystem provided in a dongle or other peripheral device (not shown) may be connected to the electronic device 100, either wirelessly or by a fixed connection such as a USB port, to provide the electronic device 100 with access to a network. If provided onboard the electronic device 100, the communication subsystems 104, 105 and 122 may be separate from, or integrated with, each other.

The main processor 102 also interacts with additional subsystems such as a Random Access Memory (RAM) 106, a flash memory 108, a display interface 103, other data and memory access interfaces such as an auxiliary input/output (I/O) subsystem 112 or a data port 114, a keyboard 116, a speaker 118, a microphone 120, the short-range communications 122 and other device subsystems 124. The communication device may also be provided with an accelerometer or orientation module 111, which may be used to detect gravity- or motion-induced forces and their direction. Detection of such forces applied to the electronic device 100 may be processed to determine a response of the electronic device 100, such as an orientation of a graphical user interface displayed on a display 110 in response to a determination of the current orientation of the electronic device 100.

In some embodiments, the electronic device 100 may comprise an integral display screen as the display 110, shown in phantom in FIG. 1. For example, a handheld or portable electronic device 100 such as a tablet, laptop, or smartphone typically incorporates a display screen 110 in communication with the main processor 102 via the display interface 103, whereas other electronic devices 100 are connected to external monitors or screens using the display interface 103, as in the case of a desktop computer. However, smaller devices, such as the tablet, laptop or smartphone, may also be connected to external monitors or screens, in which case the display interface 103 represented in FIG. 1 includes an interface for connection of an external display device. Thus, as contemplated herein, the electronic device 100 may have an integrated display interface, or may be configured to output data to be painted to an external display unit such as an external monitor or panel, television screen, projector, or virtual retinal display (via a data port or transmitter, such as a Bluetooth® transceiver, other wireless transceiver, USB port, HDMI port, DVI port, and the like). References herein to a "display" and "display screen" are intended to encompass both integrated and external display units, and references to the "display interface" are intended to encompass interfaces for both integrated and external display units.

Further, in some embodiments, the display 110 may be a touchscreen-based device, in which the display 110 is a touchscreen interface that provides both a display for communicating information and presenting graphical user interfaces, as well as an input subsystem for detecting user input that may be converted to instructions for execution by the device 100. The display 110 may thus be the principal user interface provided on the electronic device 100, although in some embodiments, additional buttons, variously shown in the figures or a trackpad, or other input means may be provided. If a touchscreen is provided, then other user input means such as the keyboard 116 may or may not be present. The controller 113 and/or the processor 102 may detect a touch by any suitable contact member on the touch-sensitive display 110.

When a user specifies that a data file is to be outputted to the display interface 103, the data file is processed for display by the main processor 102. This processing may include, in the case of structured documents, parsing of the document to render the document or a portion thereof as an image file, which is then provided as output to the display interface 103 as discussed below. The main processor 102 may thus include a visualization subsystem, implemented in hardware, software, or a combination thereof, to process the data file for display.

Depending on the input data file, the processing carried out by the processor 102 in preparation for display may be relatively intensive, and the processing may consume a significant amount of processor time and memory. In particular, processing data files originally optimized or prepared for visualization on large-screen displays on a portable electronic device display often requires additional processing prior to visualization on the small-screen portable electronic device displays. Thus, the electronic device 100 may also be provided with a graphics processor module 125 separate from the main processor 102, again implementable in hardware, software, or a combination thereof. The graphics processor module 125 may comprise a dedicated image processor with associated circuitry, including memory that is separate from other memory in the electronic device 100, such as the RAM 106, flash memory 108, and any memory internal to the main processor 102. The operation of such graphics processor modules will be known to those skilled in the art. Upon an application processing data file for display determining that the file includes content or transformations that are appropriately handled by the graphics processor module 125, those components of the file are provided to the graphics processor module 125 with associated commands for the rendering of that content for output to the display interface 103. The graphics processor module 125 can be configured to retrieve image files stored in device memory (such as RAM 106 or flash memory 108), or in its own resident memory 230, and to apply these image files as texture maps to surfaces defined in accordance with the received commands.

The electronic device 100 also includes an operating system 140 and software components 150 to 160. It will be understood by those skilled in the art that for ease of exposition, only select operating system and program components are illustrated in FIG. 1. The operating system 140 and software components that are executed by the main processor 102 are typically stored in a persistent store such as the flash memory 108, which can alternatively be a read-only memory (ROM) or similar storage element (not shown). Those skilled in the art will appreciate that portions of the operating system 140, and the further software components 150 to 160, such as specific device applications, or parts thereof, can be temporarily loaded into a volatile store such as the RAM 106. Other software components can also be included, as is well known to those skilled in the art.

The subset of software applications that control basic device operations, including data and voice communication applications, will normally be installed on the electronic device 100 during its manufacture and may be included with the operating system 140, although in some example embodiments these components may be provided and installed separately.

Programs 150 that may be provided for execution by the electronic device 100 can include messaging applications, including one or more of email programs 151 or one or more instant messaging (IM) programs 152. Other messaging applications for different messaging platforms, such as SMS, private or network messages, and the like, may also be included with the programs 150, as well as a unified message box application or function that provides a unified view of message or other content information associated with multiple user accounts or message types, and which serves as an entry point for access to other messaging services or applications executable on the device 100. The "unified message box" may also be known as a "unified inbox"; however, a unified message box in particular may contain inbound messages, outbound messages, or a combination thereof.

Productivity applications such as calendar applications 153, word processors, document viewers, spreadsheet programs, accounting programs, and the like may also be included, as well as other applications that may be used for productivity, entertainment or information purposes, such as feed/content readers 154, web browsers 155, media players 156 (which can include picture viewers, music players, and/or video players), social networking applications 157 (which can include messaging functions), news, weather, and other "ticker" applications 158. Further, other applications, such as the app store application 159, may be provided on the electronic device 100 to manage and track the download and installation of individual applications or applets on the electronic device 100. The app store application 159 may interface over a network with a single repository of available electronic device applications. The app store application 159 may further track the availability of updates for electronic device applications previously downloaded using the app store application 159 and present notifications at the electronic device 100 when updates are available for download. A variety of other device programs 160 may also be provided for execution on the device 100. Each of the applications 150 may be provided with a corresponding data store at the device 100 (for example, in the flash memory 108).

The individual applications 150 and operating system 140 components may be provided with associated data stores on the electronic device 100, typically in persistent memory such as the flash memory 108. Thus, for example, messages that have been sent or received by the user are typically stored in whole or in part in the flash memory 108 of the electronic device 100, and recently read content or webpages may be cached on the device 100 either in flash memory 108 or in RAM 106 for at least a current session of the reader 154 or browser application 155. In at least some example embodiments, some data generated and/or accessed by the various programs 150 or operating system 140 components can be stored at a remote location from the electronic device 100 such as in a data store of an associated host system (not shown in FIG. 1) with which the electronic device 100 communicates.

In use, a received signal such as a text message, an e-mail message, or webpage download will be processed by the receiving communication subsystem 104, 105, 122 and input to the main processor 102. The main processor 102 will then process the received signal for output via the display interface 103 or alternatively to the auxiliary I/O subsystem 112. A user can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over a wireless network through the communication subsystem 104. It will be appreciated that if the display 110 is a touchscreen, then the auxiliary subsystem 112 may still include one or more of the devices identified above.

Figure 2:
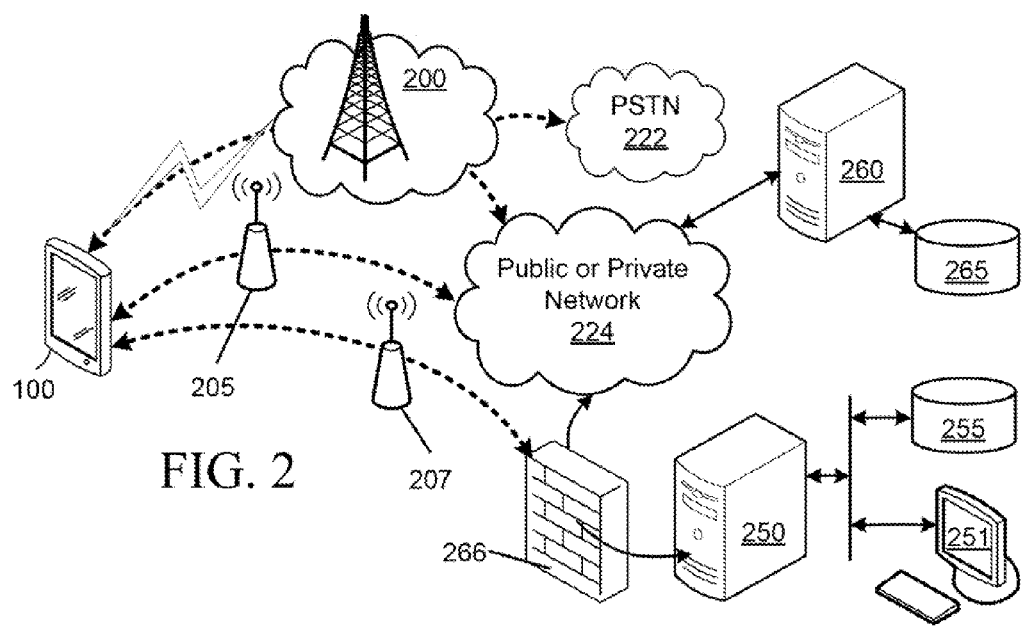
FIG. 2 is a schematic diagram illustrating a possible topology of a network serving an organizational domain and the electronic device of FIG. 1.

An example of a possible network topology including select components of the organization's network resources is illustrated in FIG. 2. It will be understood by those skilled in the art that the schematic of FIG. 2 is merely representative of only particular aspects of a network, and omits other components that are typically included for ease of exposition, such as peripheral devices, routers, mobile data servers, and the like; and further, that the network illustrated herein may include different components and/or be arranged in different topologies than that shown in FIG. 2. The organization's host system can be an own-premises local area network (LAN), or wide area network in communication with LANs, with local computing resources such as one or more servers 250, one or more data repositories 255 and client devices 251 such as terminals or workstations. Electronic devices 100 such as those depicted by FIG. 1 may be included within the organization's host system and thus may be within the organization's administrative or security domain; they may also communication with the host system over a public or private network and may, in that case, operate outside the organizational domain, as illustrated in FIG. 2.

The servers 250 and data repositories 255 represent controllers, security and information technology policy modules, application servers, messaging servers, file servers, databases, memory devices and the like for providing services to the various users via client devices, and as will be appreciated by those skilled in the art, include such components generally included in such electronic devices, such as communications subsystems for communicating over one or more fixed or wireless networks, one or more processors, data stores, disk arrays, and the like. The services can include but are not limited to messaging, directory services, collaborative applications, calendaring applications, search engines and file servers, and it will be appreciated by those skilled in the art that the various network components 250, 255, 251 as well as electronic devices 100 will be adapted for use with those services.

Messaging services are implemented using one or more servers 250 provided with means for storing messages (e.g., a database or a suitable data repository 255) for each message service or format available over the organizational network, such as email, instant messaging, voicemail, and the like. The server 250 (or a plurality of such servers) and its corresponding data repository 255 can therefore store all or a portion of received and sent messages on behalf of each user within the organization. The data repository 255 may operate as a data store for storing electronic message resistance data, as described below; however, in some embodiments the data repository storing messages and the data store storing electronic message resistance data may be distinct. In some embodiments, messages sent and received by a user may be stored only locally on the user's client device (e.g. a desktop computer or other personal computing device, such as the electronic device 100 of FIG. 1), while in other embodiments the messages are stored both locally at the client device as well as the server, in which case the message stores on the client device and the server are synchronized or reconciled periodically. Those components of the network that are used to deliver messages between parties in accordance with the description herein may be generally considered to form a messaging infrastructure.

The host system may operate from behind a firewall or proxy server 266, which provides a secure node and optionally a wireless internet gateway for the host system. Client devices such as mobile devices, such as the electronic device 100, can then access the host system wirelessly through the firewall or proxy server 266, as denoted by the access point 207. External access to the host system by the electronic device 100 may also be provided via a public or private network 224. The device 100 may be configured to access the public switched telephone network 222 through a wireless network 200, which may comprise one or more nodes 202 configured for communication in accordance a suitable mobile telephony standard. In turn, the wireless network 200 provides the electronic device 100 with connectivity to the Internet or other public wide area network 224, and thence to the organization's host system. Alternatively or additionally, if the mobile device is provisioned to communicate over wireless networks that are typically IP-based, such as wireless LANs implementing the Wi-Fi protocol (one or more of the IEEE 802.11 suite of protocols), personal area networks implementing other protocols such as Bluetooth, other wireless networks implementing wireless broadband standards such as WiMAX (one or more of the IEEE 802.16 suite of protocols), and the like, the electronic device 100 accesses the public or private wide area network 224 through a third-party access point, such as the user's own personal access point and Internet connection, or a third party hotspot device, as denoted by the access point 205.

The services above, such as directory services and messaging, can be provided in a self-hosted system as suggested above, i.e., a host system supplied by and managed by the organization itself. However, the person skilled in the art will appreciate that one or more services provided to organization users may instead by provided by third parties in a software as a service, platform as a service, or infrastructure as a service arrangement, colloquially referred to as cloud computing services. For example, email messaging services or collaborative applications can be hosted by a third party service maintaining an external server 260 and data repository 265, in which case the data store for the electronic message resistance data mentioned above may be included in the data repository 265 or in a separate store. Access to the external server 260 can be made available both externally to external client devices such as the electronic device 100, and to client devices 251 within the organization's LAN over the public or private network 224. Regardless, the organization's network services are made available only to those users who possess sufficient credentials to access the services, whether they are accessed internally or externally, and whether provided by the organization's self-hosted or virtually (externally) hosted system. Credentials may be administered by one or more administrative or security servers (not illustrated), and access privileges defined by an administrator. The users who are granted access to the organization's services may thus be considered to be within the organization's domain, which in turn can be considered to be a logical grouping of network resources and client devices. The domain can be specifically defined as a grouping of such computing devices having access to a centralized security or directory service, which is used to store and maintain user identifiers (e.g. account names or email addresses, and in the case of a centralized security service, security credentials) for those users granted access to organizational network resources.

The person skilled in the art will appreciate that the network arrangements and host system described with reference to FIG. 2 comprise only one example, and that the embodiments described herein may be adapted to operate using any appropriate configuration of the organization's host system, any public or private network providing external access to the organization's host system, and regardless whether a user of the domain accesses the host system from within the organization's LAN or externally.

As explained above, user messaging behaviour within an organization may result in a large number of unnecessary messages, or messages of marginal value to the recipient, being sent and received generally within the organization. As a result, and as reliance on messaging escalates, the cost to the organization of maintaining resources equal to handling the increasing number of messages may increase. Furthermore, individual message recipients may increasingly find that they have to contend with more messages in their inbox than they have time to personally process. To a sender, the personal consequences of sending excessive amounts of electronic messages are relatively non-existent. However, from a technical perspective, the more messages sent, the more technical resources must be dedicated to maintaining the sender's message store: the user's collection of "sent" messages may be quite large, requiring extra storage space both in a primary store as well as in backup systems. To the recipient of an excessive volume of messages, the consequences are more apparent: the large number of messages will be added to the recipient's inbox, increasing the volume of data that the recipient must review and deal with in some manner (whether by deleting, reading, and/or responding to the message). The technical cost at the recipient side thus also includes additional storage space to accommodate and back up the increased number of messages, as well as increased consumption of technical resources (processor time, battery power, and so forth) as the recipient's client device is used to download, process, and display messages. In addition, as a result of the increased number of messages being sent, the messaging infrastructure provided by the organization must commit additional resources to route those messages.

As a result, in an environment where senders are not restricted in the use of electronic messaging, the costs of increased message flow senders versus recipients can be imbalanced. This is particularly the case when one considers the example of an email message sent to a number of recipients (either as direct recipients, or as carbon copy or blind carbon copy recipients); a single copy of the message may reside in the sender's sent items folder in his or her message data store, but a copy of the same message will be generated for the messaging infrastructure and provided to every identified recipient for storage in their respective inbox.

While some solutions have been provided to address the problem of the "exploding" inbox, such as filtering and prioritizing, these solutions do not themselves relieve the burden on the messaging infrastructure, nor do they relieve the burden on the individual recipient. Filtering typically involves the automatic direction of received messages to different destinations (e.g., forwarding to an assistant, or directing to a particular message folder) based on factors such as sender identity or keywords contained in the message. Prioritization typically involves the automatic ranking of received messages as more or less important based, again, on factors such as sender identity or message keywords. Filtering and prioritizing, however, do not reduce the number of messages that are actually sent to the recipient, and do not necessarily absolve the recipient of the responsibility of dealing with a received message somehow, even if that message is ranked as having low importance. Furthermore, the onus is placed on the recipient and/or the recipient's system to define the filter criteria or to define rules for prioritizing messages, and to implement those criteria and rules. Filtering and prioritization are generally not expected to have any beneficial effect on sender behavior by reducing the number of messages of marginal value that are sent, nor are they expected to have any effect on a sender's propensity to address an email message to multiple recipients, not all of whom may be necessary addressees of the message.

A solution to this problem is to make the so-called "cost" of sending electronic messages more apparent to the sender. In the embodiments described herein, this solution is implemented in a manner that enables improved management of message traffic within the organization and improved handling of messages addressed to a given recipient. To accomplish this, a form of metering of electronic messages is applied, based on an electronic message resistance value associated with each recipient of a message. The electronic message resistance of the recipients of a message is used to determine a message handling policy and/or a priority for that message, without requiring the messaging infrastructure (e.g., a server or mail transfer agent) to evaluate a priority of the sender's message, or to engage in traffic shaping based on an evaluation of the message content. The embodiments described below operate, in part, to provide an indication to the sender and/or the sender's system of the expected handling of the sender's message by the messaging infrastructure and optionally by the recipient and/or recipient's system, without first requiring the recipient or recipient's system to evaluate the sender's message as generally required by the filtering or prioritizing solutions mentioned above. In operation, these embodiments may lead to a reduction in the number of messages sent overall within the organization, thereby reducing the burden on the recipient and recipient's system to evaluate received messages.

Initially, an electronic message resistance is defined for each user (who may be a recipient of a message) within the organization. Typically, the electronic message resistance will be defined only for users registered or otherwise associated with the organization, and namely those users for whom accounts are maintained in an organization message server such as the server 250 or 260. Electronic message resistance values, however, may be defined for recipients located outside the organizational domain. The electronic message resistance values can be stored in association with the user accounts or in association with the userid or address of the recipient in a directory.

The electronic message resistance may be conceptualized as a form of artificial "cost" of sending an electronic message to a recipient; the higher the electronic message resistance value, for example, the higher the cost to the messaging infrastructure and/or to the sender. A value for the electronic message resistance may therefore be assigned for a given user based on considerations such as the size of the message that a sender proposes to send to the recipient user (a larger message consumes more storage space than a smaller message, and is therefore more "costly" so would be assigned a larger electronic message resistance); the position of the user within a hierarchy of users within the organization (for example, a user higher in the hierarchy may be associated with a greater resistance value); the location of the user, or the time of day; or based on other technical considerations such as available storage space allocated to the user (for example, if less storage space is available in the data repository 255 or 256 to store additional messages, then the electronic message resistance associated with the user may be increased). The electronic message resistance value may also be determined based on the average "demand" the recipient places on the messaging infrastructure, such as the average volume (in absolute numbers of messages, in kilobytes, or in another suitable unit of measure) of messages the recipient receives per unit time (for example, the number of messages received per day). Similarly, the electronic message resistance value may also be determined based on the demand the recipient places on the messaging infrastructure as a sender of messages. Resistance may also be determined in whole or in part by the available messaging infrastructure resources. For example, during a high-traffic period when a large volume of messages are being received and/or sent via the messaging infrastructure, the electronic message resistance value allocated to individual users or to individual messages may be increased, reflecting the fact that the infrastructure is currently subject to higher "pressure". When the message volume exceeds a predetermined level (which may occur during periods of excessive use or message flooding, such as during a denial of service attack), the resistance value may be fixed at a maximum value. As will be appreciated from the determination of priority handling below, displaying the electronic message resistance value for sending a message to a user intending to send a message can be used to reflect the relative speed with which the message will be delivered to the recipient; a high value, representing high pressure on the system, can therefore indicate that messages sent via that message server and infrastructure will be delayed.

The electronic message resistance thus may be determined from factors including one or more of user characteristics, message characteristics, message infrastructure characteristics, or external factors (such as location or time of day). The electronic message resistance value provides a quantification of a barrier to entry, so to speak, associated with accessing the message services offered by the organization to contact the user. In some embodiments, the absolute electronic message resistance value allocated to a user is used to determine handling of a message sent to that user, while in other embodiments a differential is used, such as the difference in resistance values between the sender and recipient, or between the sender's resistance value and a resistance value limit set of that user or the system. The resistance value may be determined for each participating user within the domain at a given point in time based on historical data for the user, his or her messages or inbox, and/or messaging infrastructure, and applied thereafter. The value may be redetermined for a user on a periodic or ad hoc basis (for example, once a week or once a month, or each time the user logs in, or upon a change in the user's position in the organizational hierarchy). Alternatively, the value may be redetermined on an ongoing basis; each time the message server 250 or 260 receives a message from the user or for the user, the electronic message resistance value may be updated to reflect any incremental change due to the message characteristics. As noted above, the electronic message resistance value may be based at least in part on a time of day or location; when a change in one of these external factors is identified to the server, the value may be updated to reflect the change. In the case of a time of day factor, electronic message resistance may be deemed to increase after business hours, as explained below; in that case, the electronic message resistance value for every participating user within the domain may be updated when the server determines that it has entered or exited a relevant business hour time period.

The electronic message resistance is then used by the message server 250 or 260 to determine how the electronic message sent to the recipient associated with this resistance value is to be handled. The electronic message resistance thus serves a technical function beyond merely representing a fictitious or real "cost" of sending an email message. Furthermore, as will be explained below, the electronic message resistance can also be used to provide to the sender and/or sender's system, as the electronic message is being composed, an indication of an expected handling of the electronic message at the message server and/or the recipient's system once it is sent from the sender's system (for example, indicating that the message will not be delivered for a certain period of time, or indicating that the message will be accorded lower or higher priority). Thus, the electronic message resistance effectively operates as an alternative to functions that may not be available in the organization's messaging system, such as delivery and read receipts which confirm to a sender when an email message is delivered to the recipient's system, and when the message has been marked read at the recipient's system. The electronic message resistance also functions as an alternative to presence data (which is typically associated with instant messaging), since it may be used at the sender's system to indicate the recipient's "presence" or availability to read the sender's message.

Figure 3A:
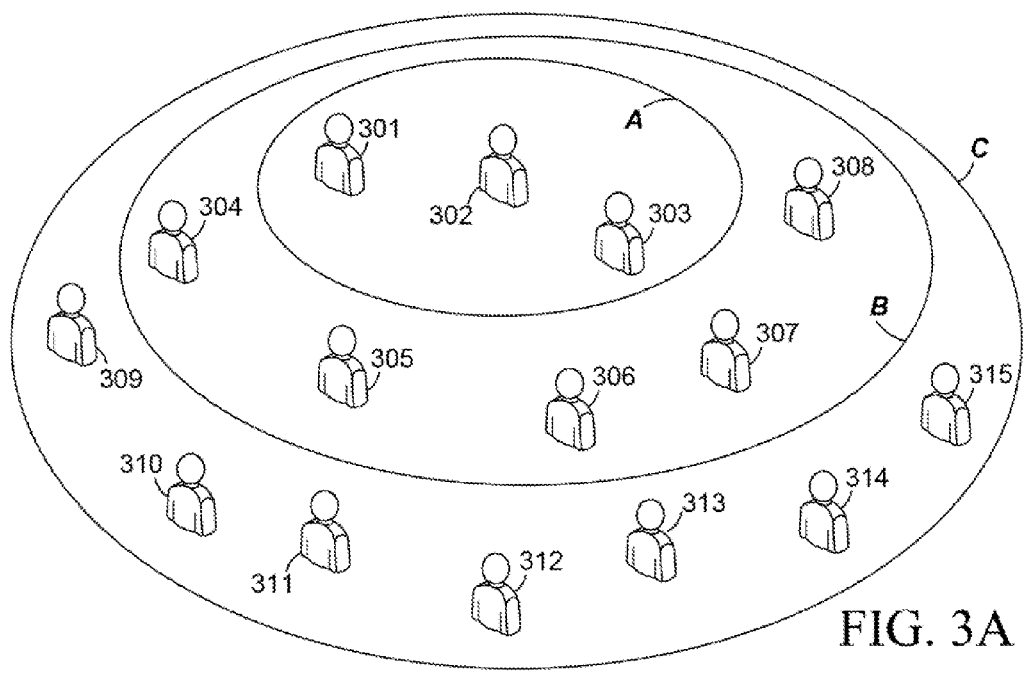
FIG. 3A is a schematic diagram illustrating a set of users within an organizational domain allocated to different bands of electronic message resistance determined using a first criterion.
Figure 3B:
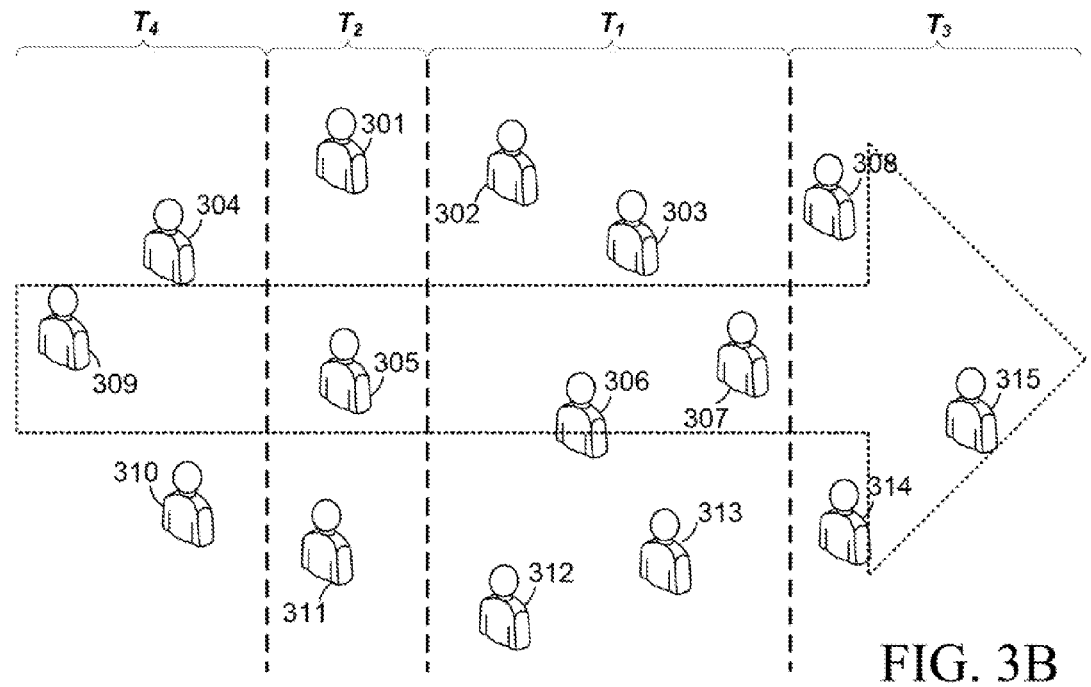
FIG. 3B is a schematic diagram illustrating the set of users of FIG. 3A, allocated to different bands of electronic message resistance determined using a second criterion.
Figure 3C:
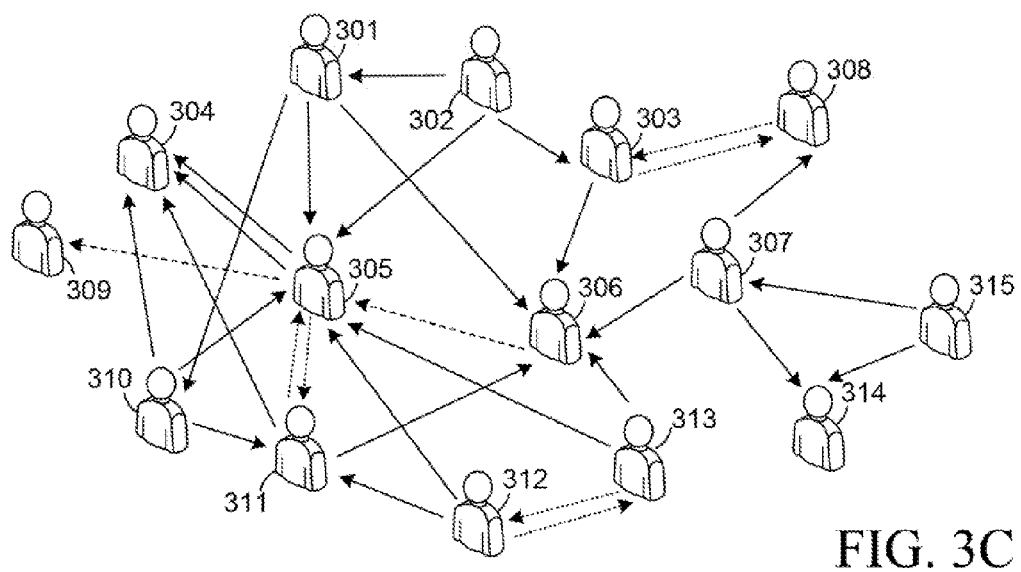
FIG. 3C is a schematic diagram illustrating the set of users of FIG. 3A, allocated to different bands of electronic message resistance determined using a third criterion.

FIGS. 3A through 3C illustrate examples of methods for determining an electronic message resistance for users within an organization. These methods may be used individually, or in combination with one or more of the other illustrated methods, or in combination with other criteria not illustrated in the accompanying figures. Depending on the factors used to determine the electronic message resistance, the resistance may be evaluated either at the recipient's system (e.g., a receiving terminal such as the electronic device 100), at the message server 250, 260, or at the directory server.

FIG. 3A illustrates an example where a hierarchy of users is defined within the organization, and electronic message resistance values are allocated according to the hierarchy. The users 310 through 315 illustrated in FIGS. 3A through 3C are each provisioned with accounts in the organization's domain, whether self-hosted or externally hosted by a third party. Messaging services in particular are accessible by the users through messaging clients executing on the users' client devices 100, 251, which communicate with a message server such as the server 250 or 260. The message server, or a directory server (not shown in FIG. 2) in communication with the message server provides access to a global directory listing or contact database for the organization. The organizational directory listing may not be truly global for each user; for example, users may have differing levels of access to network resources depending on their credentials or permissions granted by an administrator. This directory listing stores contact data (e.g. first and last name, friendly or common name, mailing address, email address, IM address, telephone number and/or SMS number, and so forth) for each user within the organization. Optionally, the directory listing stores contact data for individuals and other entities outside the organization. The individual users 301 through 315 within the domain may have a personal contacts database or address book, which can be a subset of the contact data in the global directory listing, or contain contact data for other individuals or entities not represented in the global directory listing. The address book data can be accessed through an independently executing address book application on the client device, or alternatively through the user's messaging client application when the user wishes to look up an address for a recipient for a message being composed.

In FIG. 3A, the users are divided into three levels within the hierarchy, A, B, and C. It will be understood that there may be more or fewer levels, and the hierarchy may be a flat organizational structure in which group A is not in a tier "above" B, and B is not in a tier above C. For ease of reference, though, "hierarchy" in this description includes flat and other alternative organizational structures, and is described in the context of a tiered structure. A given user is assigned to a single level or group.

In this example, each level is associated with a defined range of electronic message resistance values; for example, those users 301-303 within the highest-ranked level A may be associated the highest single electronic message resistance value, or with a value within a highest specified range of electronic message resistance values. Those users 304-308 assigned to the middle level B may be associated with a single electronic message resistance value or a range of electronic message resistance values less than the single value and/or range of level A. Users 309-315 assigned to the lowest level C may be associated with a single electronic message resistance value or range of electronic message resistance values less than those associated with level B. The electronic message resistance values contemplated herein may be numerical values or other values capable of being compared to a predefined value or level. If represented by numerical values, the resistance may include values other than integers.

Not every user within a given level of the hierarchy need have the same electronic message resistance value; the values may differ within each level A, B, C based on additional factors or based on a more precise hierarchical ranking of the users 310 to 315. Thus, for example, those users within C may be allocated electronic message resistance values of at least zero and less than 10; users within B may be allocated electronic message resistance values greater than 10 and less than 50; users within A may be allocated values greater than 50. In these examples, it is presumed that a higher number represents a greater resistance or barrier to a sender wishing to send a message to that user. Thus, in a tiered organizational structure, higher-ranking employees 301-303 would be assigned a greater electronic message resistance value on the presumption that copious emails to those users should be discouraged. An electronic message resistance value based only on a criterion such as ranking within an organization hierarchy provides electronic message resistance measurements that are likely highly stable, as they are unlikely to change except on occasion of a change to organizational hierarchy, or a change to the organization's membership.

FIG. 3B illustrates a methodology where an electronic message resistance value is allocated to users 301-315 according to a time of day. In FIG. 3B, the time periods illustrated correspond to periods or phases during a 24-hour day, rather than time zones. For example, time period $T_1$ could correspond to "business hours" (e.g., 9 a.m. to 5 p.m., or 8 a.m. to 8 p.m.) for the time zone of either the server 250, 260 or directory server, or the user's current location. In the case of the user's current location, location data for each user may be collected at the message or directory server, and may be based either on the user's office location or based on location data received from the user's mobile device, such as the electronic device 100. Methods for obtaining such location data from mobile devices will be known to those skilled in the art. The time periods $T_2$ and $T_3$, immediately adjacent to time period $T_1$, therefore represent the periods immediately before and after the business hour period respectively, for example one or two hours in duration. Finally, the time period $T_4$ represents the balance of the 24-hour day.

A different range of electronic message resistance values may be assigned to users depending on the time period in which they are currently located. Typically, resistance to messages would be lowest during business hours, when users are expected to be reading and responding to messages; the same or somewhat higher immediately outside business hours (in time periods $T_2$ and $T_3$); and highest overnight (time period $T_4$). Thus, users 302, 303, 306, 307, 312 and 313 would be assigned values in the highest range, while users 304, 309 and 310 would be assigned the lowest. On the other hand, for the purpose of email traffic management and reducing the load on the message server during peak periods, an increased electronic message resistance value might be assigned during the expected highest-traffic periods (likely time periods $T_1$, $T_2$ and $T_3$), and a lower value during off-hours ($T_4$). As the day progresses, the users 301-315 will enter the next time period (as indicated by the direction of the arrow in FIG. 3B), and their associated electronic message resistance value can be updated accordingly. As in the methodology of FIG. 3A above, not every user within a given time period needs to be assigned an identical electronic message resistance value.

FIG. 3C illustrates a further methodology for assigning electronic message resistance values. In this case, statistics are compiled reflecting the impact on the messaging infrastructure and the sender's and/or recipient's message store. These statistics could be compiled based on a defined time period, such as one day. For each of users 301-315, the arrows indicate the direction of an email message. Thus, for example, user 305 is the most popular and is also the user requiring the greatest number of resources, receiving seven emails, while sending four emails. The electronic message resistance values may be computed based on the number of messages received by the user, in which case users 302 and 315 would have values of zero (no incoming messages), while user 305 would have the highest value of 7. Assigning a higher value to user 315 in this manner may, as discussed below, have the effect of reducing or slowing the flow of incoming messages to that user, thereby reducing the load on the message server during this time period, as well as the load on the user 305's own messaging client.

When the time frame used to gather these statistics is limited to a relatively short period of time—such as one day, or a shorter time period—a resistance value based on the number of received and/or sent messages can also provides a measure of the recipient's availability, and optionally of the likelihood that the recipient will read the sender's message. For example, if the message traffic illustrated in FIG. 3C were taken over a short period of time, the data may indicate that the user 305 is actively reading and responding to emails since he received seven and responded to four, suggesting that he is receptive to incoming messages; while user 304 is not, having received four but responded to none. In this variant, it may not be considered a priority to route messages to the user 304, since those messages may not be read by the user 304 during this time period. Instead, it may be considered a higher priority to ensure that messages addressed to the user 305 are delivered, since he is more likely to wish to respond to the message quickly. In that case, the electronic message resistance value may be computed as an activity rate, e.g. number of messages received divided by number of messages sent by that user (while the sent messages are not necessarily in response to the received messages, it is not unlikely that messages sent at about the same time as messages are received are related). Thus, for user 305 the value is 1.75 (7/4), while for user 315 the value is zero. For those users who receive one or two messages during that time period but do not send messages, such as users 309 or 314, a low value such as 0 or 2 may be arbitrarily assigned; however, if the user receives a higher number of messages yet does not send any messages, such as user 304, then a default maximum value (e.g., 10) can be assigned. Thus, the resistance value is greatest for those users who have received a larger number of messages but are not responding; it is lowest for those who are actively sending their own emails, or who have only received a small number of messages without responding.

The activity rate can be computed more precisely by counting only those sent messages that reference an incoming message received by that user during the time period. These sent messages can be identified by tracking the user's activity by message thread or conversation, rather than by individual message. Methods for the determination of message thread membership of a given message will be known to those skilled in the art. Email messages that are members of the same thread are illustrated by dotted and dashed arrows in FIG. 3C. Thus, user 305 has propagated two message threads, one with user 311, and another with users 306 and 309; other message conversations shown are between users 303 and 308, and 312 and 313. The computation of activity rate would then include all messages received during the time period, but would only include those sent messages during the time period that respond to, or forward, messages received during the same time period. Thus, for user 308, the activity rate would remain the same, but for user 305, the activity rate would increase to 7/2=3.5.

Additionally or alternatively, rather than only counting all sent messages during the time period, changes to received message status may also be included, so the activity rate would be computed as the number of received messages divided by the number of messages "processed" by the user. For example, not all of user 305's incoming seven messages may necessitate reply, but he may have read all of them. As the user marks each message as open or read at his message client (e.g., at the electronic device 100), the status of the message as opened will be updated at the message server 250 or 260. Those messages were thus "processed" by the user, and can therefore count towards the activity rate. Thus, if user 305 had in fact marked all incoming messages as opened, his resistance would be 7/7=1. He would therefore have a non-zero electronic message resistance value, reflecting that he had received some non-zero volume of messages during the time period, but the value would be relatively low reflecting the fact that he is being responsive to the fact that messages have been received in his inbox. Similarly, if user 304 had marked her of his incoming messages as opened, then her activity rate would be 4/2=2.

However the electronic message resistance value is computed, it can be updated for each subsequent time period, or each time the user sends or receives a message. For example, the user 304 may have built up a high electronic message resistance value because she was in a meeting, and unable to respond to messages; once she leaves the meeting and begins responding, her electronic message resistance value will decrease as her sent messages are included in the recalculation of the value.

The techniques used to compute electronic message resistance values illustrated in FIGS. 3A to 3C are not intended to be limiting. Other techniques may be used, including the arbitrary fixing of a value by an administrator or by the user him- or herself. These techniques may be used to compute an initial resistance value, but may also be used to increment or decrement a previously-set electronic message resistance value, and may also be used in combination. For example, user 304's electronic message resistance value may be initially set at a value of 11, based on his role within the organization as illustrated in FIG. 3A. However, this value may be set for the "business hours" period $T_1$ of FIG. 3B, and the system or the user's electronic device may be configured to decrease the resistance value during off-hours by a predetermined factor. Still further, statistics reflecting the user's responsiveness may be used to reduce or increase the electronic message resistance value. For example, the value may be incremented by an amount reflecting the activity rate described above.

Figure 4A:
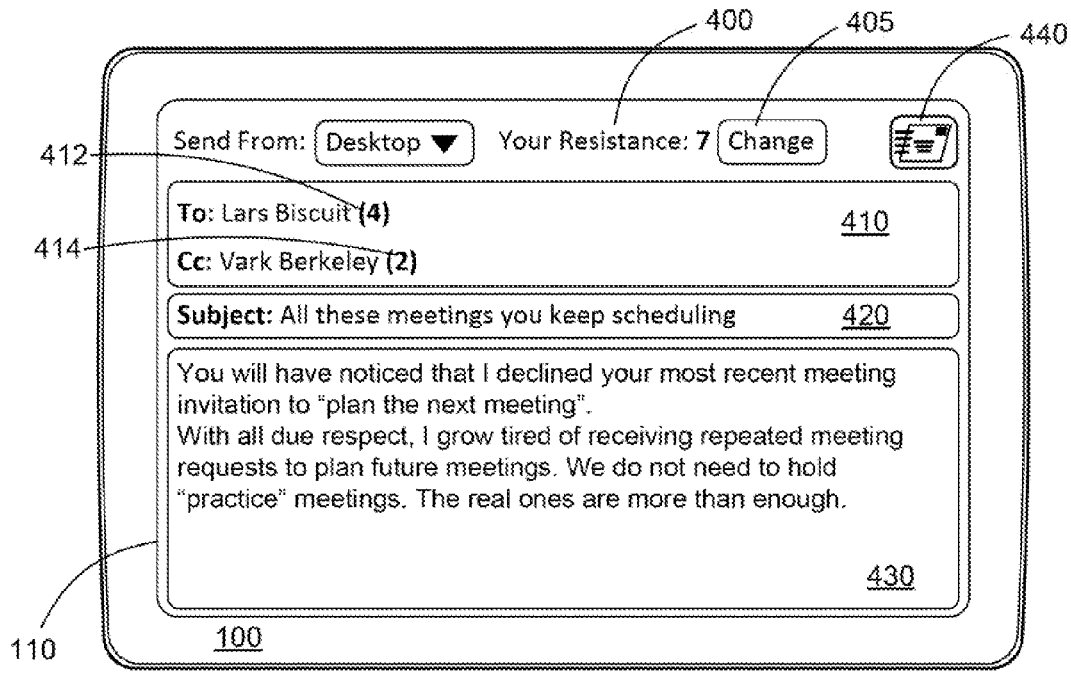
FIG. 4A is an illustration of first example user interface screen displayable at an electronic device.

The electronic message resistance values for various user-recipients can be displayed to a user composing an electronic message at a client device 251 or electronic device 100 to permit the user to evaluate the relative resistances of both herself and the intended recipients of a message. FIG. 4A illustrates an example of a first message composition screen that may be displayed to a user at an electronic device 100. The message composition screen typically includes a recipient address input field 410, a subject line input field 420 (although in the case of some message formats, no subject line is required and so the subject line input field 420 is not displayed), and a message content input field 430. In this example, user's own electronic message resistance value 400 is displayed for reference. In some embodiments, the user may be given the opportunity to change the value; a user interface element 405 is displayed in the composition screen, which may be actuated by the user (e.g., by tapping or clicking on the element 405) to invoke an instruction to display a dialog box or new screen for editing the value. The ability to alter the electronic message resistance value may be restricted; for example, in a hierarchical organization, only those users within the highest tiers may be permitted to alter the value without receiving prior authorization from an administrator. Alternatively, the user may be permitted only to reduce her electronic message resistance value.

Recipients are identified for the message being composed. In the case of a new email message, the user will typically enter one or more recipient identifiers in the "To:" line in the recipient address input field 410, and optionally one or more recipient identifiers in the Cc: or in a Bcc: (not shown) line. The address input field 410 may be populated with addressee information (e.g., an email address), either entered directly by the user or selected from a set of personal address book entries or autofill contact data store entries. In those cases where the message is a reply to a previously received message, the address input field 410 (in particular the direct addressee) may be automatically populated with the address of the sender and optionally recipients of the previously received message when the user selects a "reply" command for that previously received message. In those cases where the message is a reply to a previously received message or a forward of a previously received message, the subject line field 420 may be automatically populated with a subject line derived from the previously received message's subject line. Where the message is a reply or forward of a previously received message, the message content input field 430 may be populated with content from the previously received message. Each of the fields 410, 420 and 430 is typically editable by the user composing the message, even if those fields are first populated with data from a previous message.

Once one or more recipient addressees have been identified in the address input field 410, the messaging client providing the message composition screen retrieves electronic message resistance values for each of the identified recipients. The electronic message resistance values may be requested by the electronic device 100 or client device 251 from the message or directory server storing the values upon determination that an addressee had been added to the address input field 410. Alternatively, for those recipients whose contact data is stored in a personal address book entry at the device 100, 251, the current electronic message resistance value may be stored locally at the device with the contact data, and synchronized with changes as they are made at the server. The electronic message resistance values are then displayed for each of the identified recipients 412, 414. The user can therefore easily review the resistance values for each of the intended recipients and gauge, based on those values, the potential "responsiveness" of those users to the message if it were sent at that time. Using the methodology illustrated in FIG. 3C, for example, it may be determined by the user authoring the message that the recipient Berkeley likely only has a small number of received messages that are unread or not responded to, while the user Biscuit has a greater number of such messages and therefore less likely to read this message quickly, or before Berkeley does. The electronic message resistance value, in this case, provides an indicator of the relative state of the potential recipients' inboxes or workload without infringing on their privacy, since the actual inbox content or message count is not provided to the user composing the message. The user can also compare the electronic message resistance values for the recipients against her own as a gauge of the recipients' workload as compared to her own, and determine whether to manually add a priority flag (e.g., mark the message as "important", or add a "follow up" flag, etc.) to the message prior to sending, or to simply save the message as a draft and send it at a later time when she might expect a faster response.

In some embodiments, the resistance values displayed 412, 414 may be updated in substantially real time as changes are made. Thus, the values displayed in FIG. 4A may be updated upon receipt of a notification from the server that a value has changed.

As mentioned above, the relative resistance values associated with various users may be used to determine a message handling policy to be applied by the message server 250, 260 and/or the message client application used to compose and initiate transmission of the message by the user. The implementation of the policy may be based solely on the electronic message resistance values of any identified potential recipients for the message, or on a combination of the recipient resistance values and the sender's resistance value. Message handling policies can include, but are not restricted to, preventing the message from being sent altogether, delaying delivery (e.g., queuing the message for delivery during an off-peak or lower-resistance period), and applying a higher or lower priority level to the message.

A resistance threshold may be assigned to each user; for example, users within the organization may not be permitted to send a message if the combined electronic message resistance value for all designated recipients exceeds a defined threshold such as 25, 50 or 100, which may be fixed by an administrator. If the combined resistance value exceeds the threshold, then the "send message" button 440 or other "send message" menu option or command may be disabled at the client or electronic device 251, 100 until the user takes steps to reduce the resistance (by deleting one or more recipients) or to increase her assigned threshold value. In this manner, the electronic message resistance values are used to reduce the burden on the messaging infrastructure by reducing the number of recipients of the message.

Figure 4B:
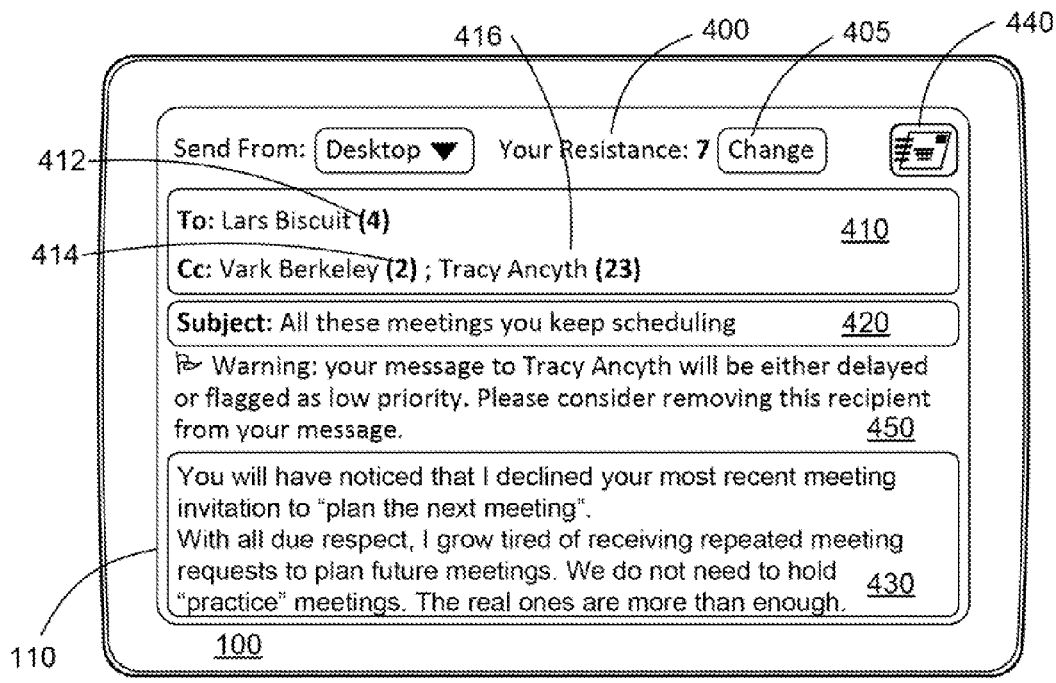
FIG. 4B is an illustration of a second example user interface screen displayable in response to a detected level of electronic message resistance.

Alternatively, the user may not be prevented from sending the message at all, but its handling will be accorded lower priority in the messaging infrastructure and optionally in the recipient's inbox. FIG. 4B illustrates an example of such a message handling policy. In this case, a further Cc: recipient with an electronic message resistance value of 23 has been added by the composing user. If a threshold of 25 had been fixed for the user, then the total resistance for the message now exceeds that threshold; accordingly, in this embodiment, the message server may either automatically flag the message with a "low priority" flag, delay sending the message for a defined period of time, or place the message in queue for sending, but permit other messages to take precedence over that message, even if those other messages are received later by the message server. If the message is flagged with a low priority flag, the transmission of the message may not be delayed by the message server at all, but the fact that it has a low priority flag may cause the message to be displayed at the recipient's own client or electronic device in a low-priority message list (e.g., at the bottom of the list of new messages in the recipient's inbox). If message sending is delayed by the message server, the delay may be for a fixed period of time (e.g., one hour); until an off-peak period (e.g., after business hours); or until it is determined that the combined electronic message resistance value for the message has dropped below the threshold. In the latter case, it is possible that the combined resistance will never drop below the threshold, so the message may still be sent at the expiration of a predefined period (e.g., 24 hours). As shown in FIG. 4B, when the combined resistance value surpasses the preset threshold, a warning message 450 is displayed in the email composition screen, cautioning the user that the message may not be handled with the level of urgency that the user might wish.

The threshold value that is used to determine when to invoke a message handling policy may be dependent on both the recipient resistance values and the sender resistance value. For example, the user's own resistance value (7) may be compared to each of the individual recipients identified in the address input field 410 to determine how the message will be handled for each of those recipients. When the one of the recipient's resistance value exceeds the sender's resistance value, then either sending the message is disabled, or a messaging handling policy such as one of those described above is applied. Thus, in the example of FIG. 4B, the sender's own resistance value is sufficiently high to permit sending the message to the recipients Biscuit and Berkeley without consequence, but is not high enough for the recipient Ancyth.

Those skilled in the art will appreciate, then, that the electronic message resistance value may operate as an alternative to instant messaging presence data, which is typically served by a presence server on a network to an IM recipient's contacts to indicate to those contacts whether the recipient is available to participate in an IM conversation. Unlike IM presence, the electronic message resistance values are also used to determine message handling policies and message priorities.

The defined threshold value can be applied for each message the user attempts to send as in the example above, or alternatively can be used as a daily or hourly limit (or a limit for another defined period of time) that may be "consumed" by the user's sent messages. In the latter embodiment, the user may be permitted to send any number of messages to any designated recipients, provided the combined electronic message resistance values for those messages does not exceed the limit for that period. If the user reaches the limit in that period, then the user may be expressly prevented from sending a next message during that period that would exceed the limit (for example by disabling the "send message" command), and/or the message may be subjected to the message handling policy described above. The limit is reset at the start of the next period (e.g., the next hour or the next day). The limit may vary from period to period, based on considerations similar to those described above for the electronic message resistance value; for example, during high-traffic periods when the messaging infrastructure is subject to higher pressure, the limit may be set at a low value to discourage the sending of a large number of messages.

Figure 5:
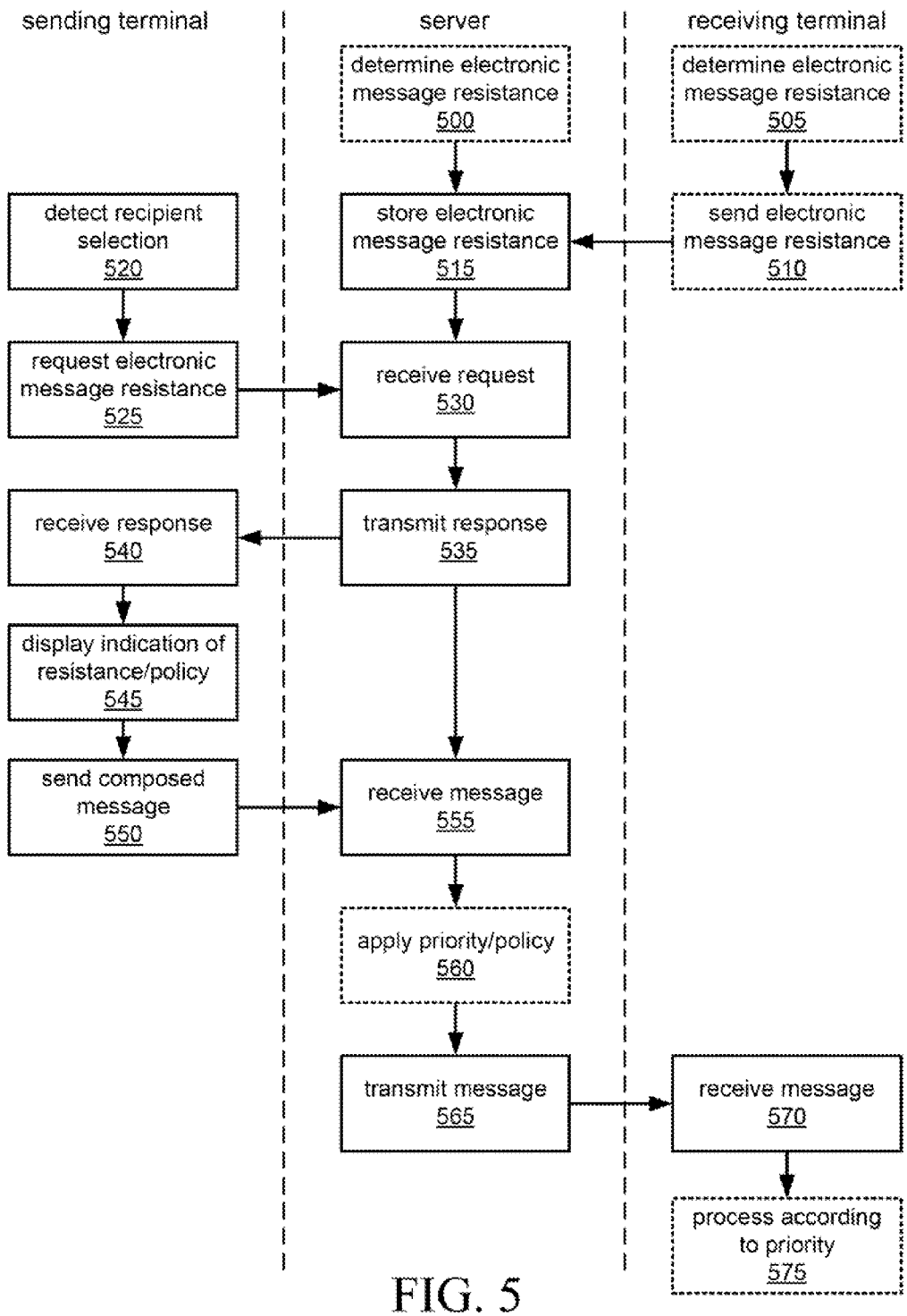
FIG. 5 is a flowchart illustrating a method of determining and applying a message handling policy or priority according to an electronic message resistance level.
Figure 6:
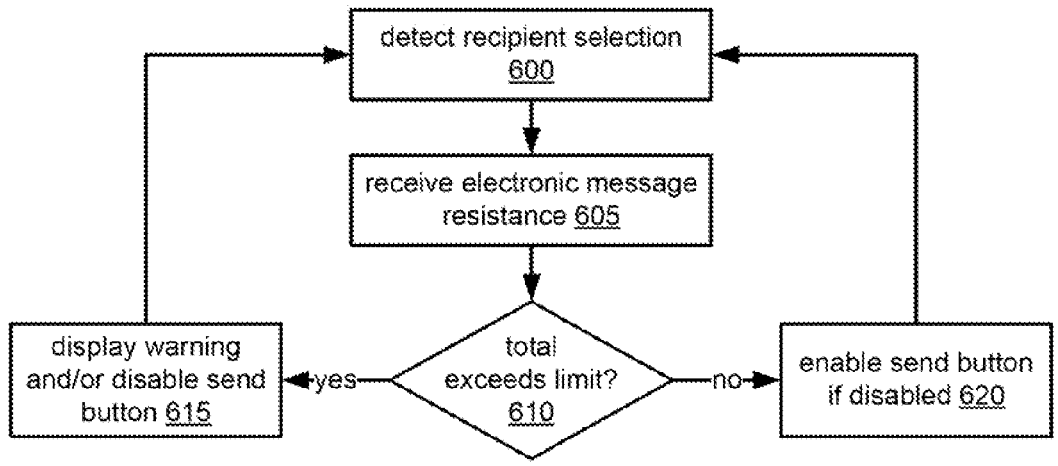
FIG. 6 is a flowchart illustrating a method of controlling a messaging client based on an electronic message resistance.

FIG. 5 illustrates a general method for implementing these embodiments. At 500 or 505, the electronic message resistance value for each recipient is determined. As indicated in FIG. 6, this value may be determined either at the server or at a user's receiving terminal (e.g., client device 251 or electronic device 100). The latter may be preferred in those cases where the resistance value is determined at least in part on local factors, such as time zone. If necessary, the computed electronic message resistance value is sent to the server at 510, where the value is stored at 515.

At 520, at a sending terminal (e.g., another client or electronic device 251, 100), recipient selection for a message under composition is detected. If necessary, the messaging client at the sending terminal requests the electronic message resistance value for each identified recipient from the server at 525. The request is received at 530, and a response transmitted to the sending terminal at 535 for receipt at 540, typically while the message composition screen is still being displayed. If the needed electronic message resistance values are already stored locally, then no request to the server may be necessary. At 545, an indication of the electronic message resistance values and/or the proposed message handling policy is displayed to the user at the sending terminal. The composed message (which may have been modified to address the reported resistance values) is then sent at 550 to the server for receipt at 555.

At 560, the server applies any priority levels or message handling policies as may be determined based on the resistance values for the recipients (and optionally the sender). The message is then transmitted at 565 to the receiving terminal. This transmission, as noted above, may be delayed according to the particular policy applied.

At 570, the message is received at the receiving terminal. If a priority level was applied by the server at 560, then the message client operating at the receiving terminal may then process the message according to the associated priority value at 575. This may include filtering the message, redirecting it to a low priority display region or folder, or implementing any other rule defined by the recipient.

FIG. 6 illustrates, in further detail, a process that may be implemented at the sending terminal when a message is being composed. At 600, recipient selection of a message is detected (as in step 520 in FIG. 5). At 605, the electronic message resistance value for each recipient is obtained. At 610, a determination is made whether the total resistance value exceeds the defined threshold. If so, then a warning is displayed, and/or the send button/command is disabled at 615. If the recipient selection is then altered, the electronic message resistance is then redetermined, and when the total no longer exceeds the limit, the send button is enabled if it was previously disabled at 620, and any warnings are removed from the display.

Figure 7:
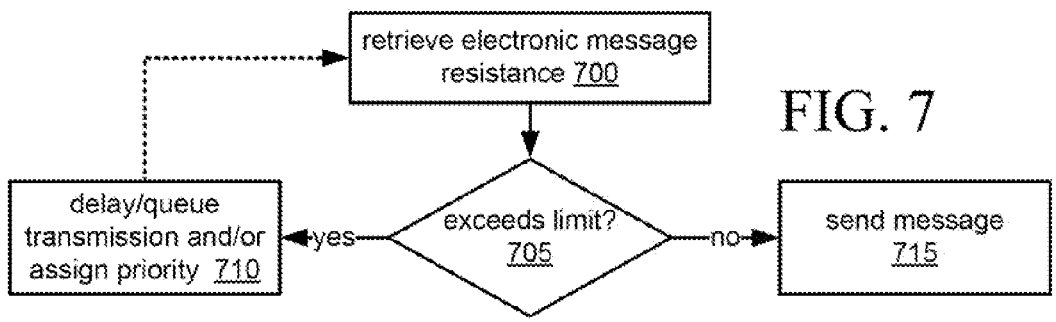
FIG. 7 is a flowchart illustrating a method of managing message transmission based on an electronic message resistance.
Figure 8:
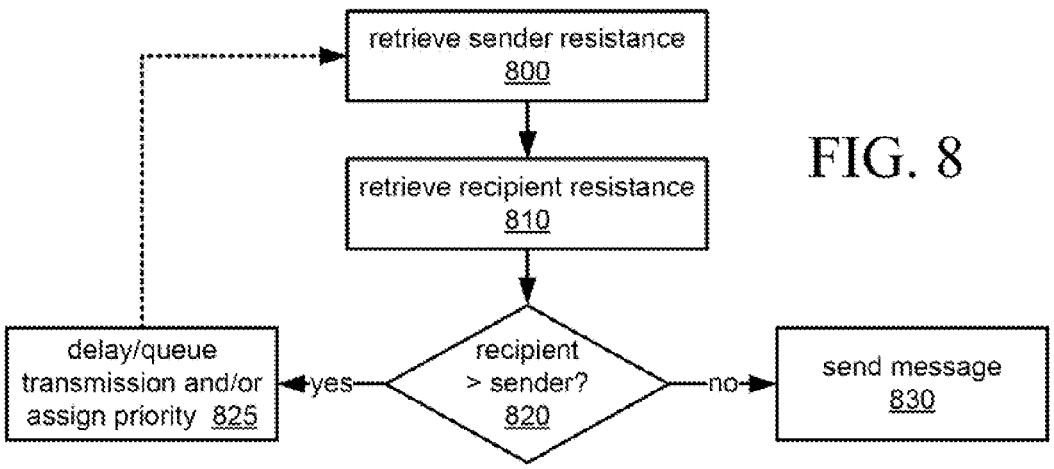
FIG. 8 is a flowchart illustrating a further method of managing message transmission based on electronic message resistance.

FIGS. 7 and 8 illustrate methods that may be implemented at a message server. Turning first to FIG. 7, when a message is received by the server for transmission to one or more recipients, the electronic message resistance values for those recipients is retrieved at 700 and a determination is made at 705 whether the total electronic message resistance value exceeds the defined limit. If so, a message handling policy as described above is applied (e.g., delay or queuing of the message, and/or an assignment of a lower priority) at 710. Otherwise, the message is sent without modification at 715. If the message transmission is delayed, then at a later time the message server may redetermine the electronic message resistance and evaluate whether it still exceeds the limit 700, 705.

FIG. 8 describes a similar process, where after receipt of a message addressed to one or more recipients, the electronic message resistance values for both the sender and recipients are retrieved 800, 805, and the difference between those values is assessed at 820. If the recipient resistance value exceeds the sender's, then the message may be delayed, queued, or be marked as lower priority at 825. Otherwise, the message is sent without modification at 830. Again, if the message transmission is delayed, then at a later time the message server may redetermine the electronic message resistances and evaluate whether the recipient value still exceeds the sender's value, 800, 810.

The embodiments above were described and illustrated in relation to client communication devices, such as wireless communication devices, communicating over wireless networks and public networks. It will be appreciated by those skilled in the art, however, that this description is not intended to limit the scope of the described embodiments to implementation on these particular systems or to wireless devices. For example, the methods and systems described herein may be applied to any appropriate communication device or data processing device adapted to communicate with another communication or data processing device over a fixed or wireless connection, whether portable or wirelessly enabled or not, whether provided with voice communication capabilities or not, and additionally or alternatively adapted to process data and carry out operations on data in response to user commands for any number of purposes, including productivity and entertainment. Thus, the embodiments described herein may be implemented on computing devices adapted for communication or messaging, including without limitation cellular phones, smartphones, wireless organizers, personal digital assistants, desktop computers, terminals, laptops, tablets, handheld wireless communication devices, notebook computers, entertainment devices such as MP3 or video players, and the like. Unless expressly stated, a client device, electronic device, computing or communication device may include any such device.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits comprising custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rightsholder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method implemented at a message server system, the method comprising:
  storing an electronic message resistance for each recipient of a plurality of recipients, the electronic message resistance representing a value determined from at least one of messaging infrastructure resources available for sending an electronic message to the recipient and messaging client resources available for receiving and storing an electronic message for the recipient, a higher value indicating a higher resource cost, each recipient of the plurality of recipients having a different electronic message resistance;
  receiving, from a sending terminal, an electronic message addressed to a first recipient of the plurality of recipients; and sending the electronic message to the first recipient with a priority based on the electronic message resistance for the first recipient,
wherein sending the electronic message with said priority comprises:
determining whether the electronic message resistance for the first recipient exceeds a limit based on an electronic message resistance for a sender of the electronic message, the sender comprising another recipient of the plurality of recipients;
when the electronic message resistance for the first recipient exceeds the limit, associating a low priority attribute with the electronic message, and delaying sending the electronic message for a defined period of time; and
when the electronic message resistance for the first recipient does not exceed the limit, sending the electronic message without a low priority attribute and without delaying said sending for a defined period of time.

2. The method of claim 1, wherein sending the electronic message with said priority based on the electronic message resistance comprises associating the electronic message with a low priority attribute when the electronic message resistance for the first recipient exceeds a defined threshold.

3. The method of claim 1, wherein sending the electronic message with said priority based on the electronic message resistance comprises delaying sending the electronic message for a defined period of time.

4. The method of claim 1, further comprising, prior to receiving the electronic message from the sending terminal, providing an indication of the electronic message resistance for the first recipient in response to a request received from the sending terminal.

5. The method of claim 1, wherein the priority is determined from a difference between the electronic message resistance for the first recipient and an electronic message resistance for a sender of the electronic message, the sender comprising another recipient of the plurality of recipients.

6. The method of claim 1, wherein the limit is associated with a defined period, and the limit is reset at a start of a next defined period.

7. The method of claim 1, further comprising, prior to storing the electronic message resistance for each recipient of the plurality of recipients, receiving an indication of the electronic message resistance for each recipient from a terminal associated with the recipient.

8. The method of claim 1, wherein the electronic message resistance for each recipient of the plurality of recipients is determined from the messaging client resources available for receiving and storing an electronic message for the recipient, the messaging client resources being determined using a number of unread messages in an electronic message inbox associated with the recipient.

9. The method of claim 1, wherein the electronic message resistance for each recipient of the plurality of recipients is determined from both the messaging infrastructure resources available for sending an electronic message to the recipient and the messaging client resources available for receiving and storing an electronic message for the recipient.

10. The method of claim 1, wherein the electronic message resistance for each recipient of the plurality of recipients is determined from the messaging infrastructure resources available for sending an electronic message to the recipient, the messaging infrastructure resources being determined using a number of electronic messages addressed to the recipient received within a defined period of time.

11. A method implemented at a sending device in communication with a message server system, the method comprising:
detecting selection of a recipient by a sender for an electronic message being composed at the sending device;
receiving from the message server system, in response to a request, an electronic message resistance for the recipient thus selected, the electronic message resistance representing a value determined from both messaging infrastructure resources available for sending an electronic message to the recipient and messaging client resources available for receiving and storing an electronic message for the recipient, a higher value indicating a higher resource cost;
displaying an indication of an electronic message handling policy for the electronic message being composed, the electronic message handling policy being determined from the received electronic message resistance by the message server system, the electronic message handling policy comprising:
when the message server system determines that the electronic message resistance for the recipient thus selected exceeds a limit based on an electronic message resistance for the sender, associating a low priority attribute with the electronic message, and delaying sending the electronic message for a defined period of time; and
when the message server system determines that the electronic message resistance for the recipient thus selected does not exceed the limit, sending the electronic message without a low priority attribute and without delaying said sending for a defined period of time.

12. A message server, comprising:
a communications subsystem; and
a data store comprising an electronic message resistance for each recipient of a plurality of recipients, the electronic message resistance representing a value determined from at least one of messaging infrastructure resources available for sending an electronic message to the recipient and messaging client resources available for receiving and storing an electronic message for the recipient, a higher value indicating a higher resource cost, each recipient of the plurality of recipients having a different electronic message resistance;
the message server also having a memory and at least one processor and being configured to:
receive, via the communications subsystem from a sending terminal, an electronic message addressed to a first recipient of the plurality of recipients; and
send, to the first recipient via the communications subsystem, the electronic message with a priority based on the electronic message resistance for the first recipient,
wherein sending the electronic message with said priority comprises:
determining whether the electronic message resistance for the first recipient exceeds a limit based on an electronic message resistance for a sender of the electronic message, the sender comprising another recipient of the plurality of recipients;
when the electronic message resistance for the first recipient exceeds the limit, associating a low priority attribute with the electronic message, and delaying sending the electronic message for a defined period of time; and
when the electronic message resistance for the first recipient does not exceed the limit, sending the electronic message without a low priority attribute and without delaying said sending for a defined period of time.

13. The message server of claim 12, wherein the message server is configured to send the electronic message with said priority based on the electronic message resistance by associating the electronic message with a low priority attribute when the electronic message resistance for the first recipient exceeds a defined threshold.

14. The message server of claim 12, wherein the message server is configured to send the electronic message with said priority based on the electronic message resistance by delaying sending the electronic message for a defined period of time.

15. The message server of claim 12, wherein the message server is configured to provide to the sending terminal, prior to receipt of the electronic message, an indication of the electronic message resistance for the first recipient in response to a request received from the sending terminal.

16. The message server of claim 12, wherein the data store further comprises an electronic message resistance for a sender of the electronic message, and the priority is determined from a difference between the electronic message resistance for the first recipient and the electronic message resistance for the sender, the sender comprising another recipient of the plurality of recipients.

17. The message server of claim 12, wherein the limit is associated with a defined period, and the limit is reset at a start of a next defined period.

18. The message server of claim 12, wherein the electronic message resistance for each recipient of the plurality of recipients is determined from the messaging client resources available for receiving and storing an electronic message for the recipient, the messaging client resources being determined using a number of unread messages in an electronic message inbox associated with the recipient.

19. The message server of claim 12, wherein the electronic message resistance for each recipient of the plurality of recipients is determined from both the messaging infrastructure resources available for sending an electronic message to the recipient and the messaging client resources available for receiving and storing an electronic message for the recipient.

20. The message server of claim 12, wherein the electronic message resistance for each recipient of the plurality of recipients is determined from the messaging infrastructure resources available for sending an electronic message to the recipient, the messaging infrastructure resources being determined using a number of electronic messages addressed to the recipient received within a defined period of time.

\* \* \* \* \*